Oct. 5, 1926.
C. F. PYE
DOORSTOP
Filed Dec. 4, 1923
1,602,044
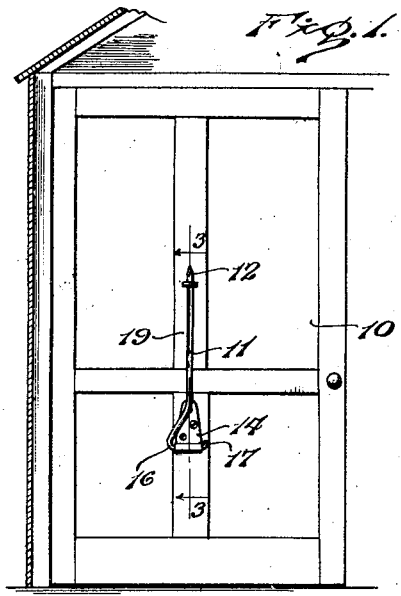
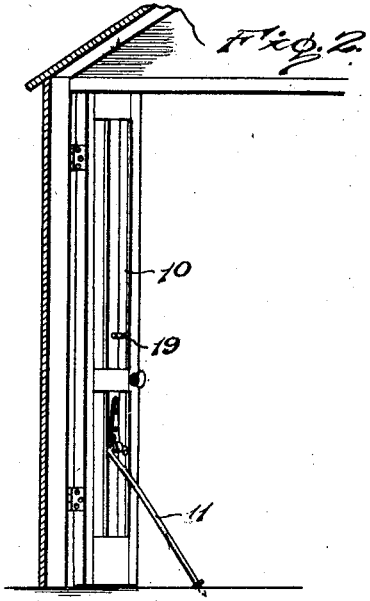
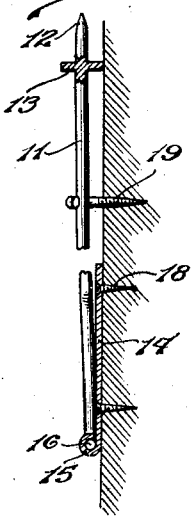
Inventor
C. F. Pye
By Lacey & Lacey, Attorneys Patented Oct. 5, 1926.

1,602,044

UNITED STATES PATENT OFFICE.

CARL F. PYE, OF WINNIPEG, MANITOBA, CANADA.

DOORSTOP.

Application filed December 4, 1923. Serial No. 678,519.

My invention relates to a device for holding doors or gates in open position, and relates more particularly to stops for garage doors.

The device consists of a leg or shank hinged to the front face of the door in such a manner that in inoperative position, the leg is swung upwardly and secured by a clip or hook in this position. After the door or gate has been opened, the leg is released and swung downwardly to engage with the ground or floor in an inclined direction in order to prevent the door from slamming to while a vehicle passes through, or as long as the door is intended to be left open.

In the accompanying drawings, several embodiments of the invention are illustrated, and—

Figure 1 represents a section of a building provided with a door to which the device forming the subject matter of the present invention is attached;

Figure 2 is a similar view to Figure 1 with the door open and the device in operation; and Figure 3 is a fragmentary section along line 3—3 of Figure 1 in larger scale showing the device in folded or upright position.

Referring particularly to Figures 1, 2 and 3, the reference numeral 10 represents a door for a garage or other building upon which is mounted the support for holding the door open. This support consists of a leg or shank 11 having a pointed end 12 and a collar 13 near its pointed end. At the opposite end the shank is formed to fit a hinge leaf 14 of any suitable kind and in these three figures, the hinge leaf is shown with a rolled edge 15 for receiving the transverse upper end or head 16 of the shank 11. As indicated in Figures 1, 2 and 3 this head 16 forms practically an L with the shank and terminates with a hook 17 adapted to prevent sliding out of the head 16 from the hinge leaf 14. The latter is secured in the usual manner to the inside of the door as by screws 18 or the like.

Some distance above the hinge leaf 14 is attached a screw hook or clip 19 for holding the shank 11 in the folded or upturned position, as best seen in Figures 1 and 3. The support is preferably made of flexible material so that the shank 11 may be sprung in under the hook 19 when raised into this position. To unfold the shank into operative position, as indicated in Figure 2, the shank 11 is pressed to one side to disengage the hook 19 and then left to fall down to the ground or floor in which it will obtain a firm hold through the provision of its pointed end 12. However, if the ground should be comparatively soft, the point will not penetrate very deeply into the same on account of the obstructing collar 13.

That portion of the shank 11 adjacent the head 16 is deflected laterally a distance to cause the head 16 to project an equal distance upon opposite sides of the shank to equalize the stress upon the head 16 and prevent its binding in the sleeve 15. Moreover the hook or keeper 19 engages about and over the shank 11, as shown most clearly in Figure 3, to retain the shank when sprung thereunder.

Having thus described the invention, what is claimed as new is:

1. The combination with a door, and a transverse sleeve thereon, of a hook-shaped keeper secured to the door above and in vertical line with the transverse sleeve and a resilient shank pointed at one end and having a disk stop adjacent the point, and having its opposite end deflected laterally and rebent to provide a cross head projecting an equal distance from opposite sides of the shank and journaled in the said transverse sleeve, the disk stop serving to space the pointed end of the shank from the door to enable the intermediate portion of said shank to be sprung under the said keeper when the shank is turned upward against the side of the door.

2. The combination with a door and a leaf secured to the door and having an end portion rolled to provide a transverse sleeve, of a hook-shaped keeper secured to the door above and in vertical line with the said leaf, and a resilient shank pointed at one end, and having a disk stop adjacent the point, and having its opposite end deflected laterally and rebent to provide a cross head projecting an equal distance from opposite sides of the shank and journaled in the said transverse sleeve, and having a projecting end portion bent to prevent displacement of the head, the disk stop serving to space the pointed end of the shank from the door to enable the intermediate portion of the said shank to be sprung under the said keeper when the shank is turned upward against the side of the door.

In testimony whereof I affix my signature.

CARL F. PYE. [L. S.]